Aug. 26, 1969

D. A. MARRA, SR 3,463,403

TORCH TIP GUARD

Filed Aug. 2, 1967

INVENTOR.
DANIEL A. MARRA SR.
BY
Parmelee, Utzler & Welsh.
his ATTORNEYS.

3,463,403
TORCH TIP GUARD
Daniel A. Marra, Sr., 641 E. Elm St.,
Palmyra, Pa. 17078
Filed Aug. 2, 1967, Ser. No. 657,919
Int. Cl. B05b *15/06;* F23d *13/24*
U.S. Cl. 239—288.5                     3 Claims

ABSTRACT OF THE DISCLOSURE

The invention resides in a protective metal cap or collar enclosing the exposed flame end of all forms of gas scarfing, gouging, cutting and welding torches.

Summary

The customary softer copper body of the torch tip is enclosed by a protective steel cap having a tapered central opening which is locked upon the tip by compression and friction due to the converging end of the cap.

Drawing

Figures 1, 2:
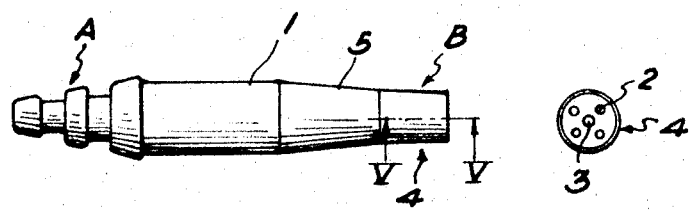
Figure 3:
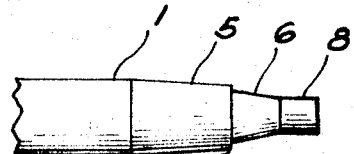
Figure 4:
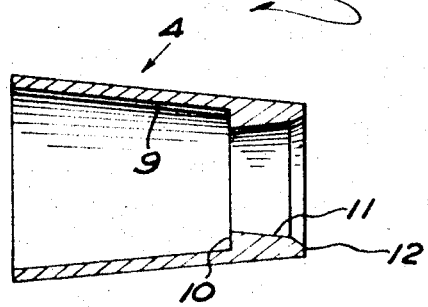
Figure 5:
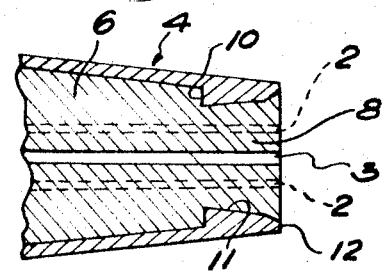

FIG. 1 of the drawing shows a side elevation of a conventional gas welding torch tip embodying the invention; FIG. 2 shows an end elevation of the torch tip illustrating the torch end protective features of the invention; FIG. 3 shows an enlarged view of an end portion of the torch tip and its preparation to receive the cap shown in cross-section on FIG. 4; FIG. 5 shows an enlarged partial cross-section through the cap, illustrating its relation to the copper tip.

A preferred embodiment of the invention

Referring now in detail to the drawings, torch tips of the character shown are well known in the art and are of various sizes but of the same general design. That is the torch tips are suitably shaped as at one end A of FIG. 1 for attachment to sources of gaseous fuel and air and have an end portion B for emission of fuel and air which are ignited to provide a controllable flame for impingement upon a metal member to perform the desired functions of scarfing, gouging, cutting, welding, etc., all of which functions or operations are well known in the art.

Heretofore the entire tip, as illustrated in FIG. 1, has been made of copper, which is relatively soft and is subject to damage when the user lays the torch down for any purpose. Since these conventional torch tips have internal channels, such as 2 and 3 (FIG. 2) for passage of air and fuel, the heated end of the torch tip is subject to damage when impinging upon an adjacent hard surface, such as metal upon which the welder has been using the torch.

The principal object of the invention is to provide a protective cap of hard metal, such as steel, and the manner of mounting the cap thereon for maximum protection of the exposed end of the torch tip.

Referring now to the drawing, FIG. 1 shows in side elevation a conventional form of a copper tip for various forms of welding and cutting torches; FIG. 2 shows an end view of the tip of FIG. 1, showing how the protective cap encloses the end of the tip; FIG. 3 shows in side elevation the copper end portion of the tip as prepared for attachment of the protective ring; FIG. 4 shows a cross-section of the protective cap and FIG. 5 shows a partial cross-section through the protective cap applied to the copper tip.

As best shown in FIG. 1, the conventional copper tip has a generally cylindrical body portion having at one end a conventional configuration A for attachment to the conventional air and gas hoses and valve for controlling admission of a flammable gas and combustion air. As best shown in FIG. 2, the copper tip conventional has a plurality of passageways 2 for flow of a combustible gas and a central passageway 3 for passage of air through the tip 1. The protective ring indicated generally as 4 encloses the end of the copper tip 1. As best shown in FIG. 3, the tapered end of the tip 5 has the portion reduced in diameter at 7 and the portion 6 tapers outward for a suitable distance and is again reduced in diameter at portion 8. The protective cap 4 (FIG. 4) is preferably of steel and tapers in length to correspond to the taper 5 of the copper tip 1. The larger diameter of the cap 4 is generally in the form of a truncated hollow cone corresponding generally to the shape of portion 6 of the tip 1, and is pressure mounted over the portion 6. The inner side walls 9 of cap 4 are generally of the same sloping contour of portion 6 of the tip 1 and are provided with opposing shoulders 10 which preferably abut the outer end of the portion 6. Cap 4 adjacent its outer or smaller end is provided with outwardly sloping walls 11 which terminate in a circular end wall portion 12. Preferably the slope of walls 9 may be slightly less than walls 6 and that of walls 11 may be about 3°. The degree of slope of walls 9 and 11 of cap 4 is not critical, preferably the cap walls 9 should have some frictional engagement with tip walls 6, and cap walls 11 should freely enclose tip portion 8. The length of non-tapered tip section 8 is such as to project through the small end of the cap 4. Thus after the cap 4 is mounted over the tip walls 6, the end of tip portion 8 is suitably swaged and expanded into the cap end cavity so as to fill the cavity defined by cap walls 11 and to lie within or flush with the outer end portions 12 of the cap 4. Due to the swaging or compression action the openings 2 and 3 through tip portion 8 may be slightly reduced and it is preferable to return the openings or channels to size by running a suitable size drill therethrough for at least the length of cap portion 11.

The finished product is shown in FIG. 5 wherein the cap portion 4 has end portions 12 protecting the end of the copper tip 1. The tapering walls 9 and 11, plus the offset 10 prevents any displacement of cap 4. It will be obvious from FIGS. 4 and 5 that no matter how the user of the torch tip may deposit it upon the ground or upon adjacent metal supports, the soft copper end of the tip is protected against damage. Even a vertical deposit of the tip will not harm the copper tip due to protective cap walls 12.

I claim:
1. A replaceable tip for gas fuel cutting and welding torches, comprising a perforated elongated torch body portion, of suitable metal such as copper, for passage of fuel and combustion air therethrough, said body portion adjacent the outer end thereof for a portion of the length thereof being in the shape of a truncated cone and terminating in a substantially cylindrical portion, a hollow steel cap portion in the general shape of a truncated cone enclosing said similarly shaped torch portion and terminating in a tapered apertured outer portion through which the cylindrical portion of the torch body protrudes, and said cylindrical torch protruding portion being swaged into intimate contact with the adjacent cap portion to secure the torch and cap in fixed relation.

2. The combination as defined in claim 1, wherein said reduced end of said cap has inturned shoulder portions abutting said underlying torch tip enclosed by said cap base portion.

3. The combination as defined in claim 2, wherein the outer end of said steel cap is substantially flush with the exposed end of the said torch tip.

References Cited

UNITED STATES PATENTS

| | | | |
|---|---|---|---|
| 2,294,392 | 9/1942 | Egger et al. | 239—288.5 |
| 2,404,590 | 7/1946 | Nantz | 239—228.5 |
| 2,764,230 | 9/1956 | Richter | 239—288.5 |

M. HENSON WOOD, JR., Primary Examiner

M. Y. MAR, Assistant Examiner

U.S. Cl. X.R.

29—523; 239—424, 602; 266—23